United States Patent [19]

Davidson et al.

[11] Patent Number: 5,771,978
[45] Date of Patent: Jun. 30, 1998

[54] GRADING IMPLEMENT ELEVATION CONTROLLER WITH TRACKING STATION AND REFERENCE LASER BEAM

[75] Inventors: Richard W. Davidson, Danville, Calif.; Fumio Ohtomo; Kazuaki Kimura, both of Tokyo, Japan; Satoshi Hirano, Livermore, Calif.

[73] Assignee: Kabushiki Kaisha Topcon, Tokyo, Japan

[21] Appl. No.: 658,655

[22] Filed: Jun. 5, 1996

[51] Int. Cl.$^6$ ..................................................... E02F 3/76
[52] U.S. Cl. ............................. 172/4.5; 172/2; 356/3.12; 364/424.07; 56/10.2 F
[58] Field of Search .................. 172/2–4.5; 364/424.07; 356/139.02, 3.12; 37/348, 382, 352; 56/10.2 A, 10.2 F

[56] References Cited

U.S. PATENT DOCUMENTS

| | | | |
|---|---|---|---|
| 3,813,171 | 5/1974 | Teach et al. | 356/152 |
| 4,537,259 | 8/1985 | Funabashi et al. | 172/4.5 |
| 4,700,301 | 10/1987 | Dyke | 356/3.12 X |
| 4,820,041 | 4/1989 | Davidson et al. | 356/1 |
| 5,100,229 | 3/1992 | Lundberg et al. | 356/3.12 |
| 5,110,202 | 5/1992 | Dornbusch et al. | 356/3.12 |
| 5,174,385 | 12/1992 | Shinbo et al. | 364/424.07 X |
| 5,375,663 | 12/1994 | Teach | 364/424.07 X |
| 5,528,498 | 6/1996 | Scholl | 364/424.07 |
| 5,548,397 | 8/1996 | Kool et al. | 172/4.5 X |
| 5,572,809 | 11/1996 | Steenwyk et al. | 364/424.07 X |
| 5,579,102 | 11/1996 | Pratt et al. | 356/3.12 |
| 5,600,436 | 2/1997 | Gudat | 172/4.5 X |
| 5,612,864 | 3/1997 | Henderson | 364/424.07 X |

*Primary Examiner*—Terry Lee Melius
*Assistant Examiner*—Victor Batson
*Attorney, Agent, or Firm*—Limbach & Limbach, LLP

[57] ABSTRACT

A control system is disclosed that controls the position of a grading implement of a construction machine according to a site plan. The control system has three basic components: a stationary tracking station, a computer connected to the tracking station, and an implement controller attached to the construction machine. The tracking station measures a distance and an azimuth (horizontal) angle to a remote target located on the construction machine and communicates that position information to the computer. The computer consults a stored site plan to determine what elevation is desired at that position and calculates a corresponding zenith (vertical) angle, and communicates the desired zenith angle to the tracking station. The tracking station in turn positions a zenith-reference laser beam at the desired zenith angle. The implement controller senses the zenith-reference laser beam and adjusts the grading implement relative to the zenith-reference laser beam until its desired position is obtained.

21 Claims, 4 Drawing Sheets

GRADING IMPLEMENT ELEVATION CONTROLLER WITH TRACKING STATION AND REFERENCE LASER BEAM

BACKGROUND OF THE INVENTION

1. Field of the Invention

This invention relates generally to machine control systems for construction machines having grading implements, and relates more particularly to a machine control system having a stationary tracking station that determines the position of a construction machine and outputs a reference laser beam to control the elevation of its grading implement.

2. Description of the Relevant Art

It is desirable to automatically control construction machinery having grading implements, such as graders, pavers, and bull dozers. A construction task typically consists of moving earth or laying pavement to achieve a finished surface that conforms to a site plan. The operators of the construction machinery typically rely on elevation references, such as stakes and strings, placed throughout the job site to guide them. Setting up such elevation references is time consuming and expensive because each reference must be carefully surveyed in order to ensure its accuracy. If an elevation reference is moved, either because its location must be graded, or through vandalism or other inadvertent act, the elevation reference must be reestablished at additional delay and expense. Furthermore, the elevation references are scattered throughout the job site, requiring skilled machine operators to translate the scattered elevation information into the desired finished surface.

There are automatic machine control systems that rely on a reference laser beam to determine elevation. A typical system of this nature has a rotating or pulsed laser beam that establishes a horizontal reference plane. A laser receiver attached to the grading implement of the construction machine senses the laser beam to provide an elevation reference. The sensed elevation of the reference laser beam is compared to a set point and a controller moves the grading implement up or down to automatically correct for any elevation error. This type of automatic machine control is intended for grading a horizontal surface at a constant elevation relative to the horizontal laser reference plane.

An improvement to the above-described laser reference system is to add an on-board computer and some means for determining the x-y position of the construction machine, which accommodates elevation changes in the site plan. Once the x-y position of the construction machine is known, the on-board computer consults a stored site plan and determines a desired elevation at that x-y position. The x-y position may be determined by equipment located on the construction machine or by equipment located elsewhere and radio telemetered to the on-board computer. A variation of such a control system is to use stationary equipment to determine the x-y position of the construction machine and to compute the desired elevation at that position and then to transmit the desired elevation to the construction machine. Either way, the system typically depends on radio telemetry, which must operate reliably in environments that are noisy and subject to vibration and weather extremes.

Automatic tracking total stations are surveying instruments used for determining the position of a remote target, typically a retroreflector. A total station accurately determines the position of the remote target in polar coordinates by measuring angles and distance. The user of the total station aligns telescope cross hairs with the remote target. The total station typically measures the azimuth (horizontal) angle and zenith (vertical) angle of the telescope, and uses a laser and detector to measure the distance to the remote target. By adding servo drives to the telescope and a tracking optical means, the total station can s can in vertical and horizontal directions, which allows it to t rack the remote target. The total station can automatically track the remote target as it moves, thus providing real-time position data for a mobile target. Model AP-L1 from Topcon Corporation of Tokyo, Japan is an example of a n automatic tracking total station.

Some surveying instruments have rotating lasers for generating reference planes. Topconts model RT-10S digital theodolite is one such instrument, and it measures azimuth and zenith angles to a remote target as well as projects a laser beam in a reference plane parallel to the collimation line of the telescope. Such surveying instruments have had limited usefulness in automatically controlling construction machines because of the need to communicate position information to an onboard computer.

SUMMARY OF THE INVENTION

In accordance with the illustrated preferred embodiment, one aspect of the present invention is a control system that controls the position of a grading implement of a construction machine. The control system has three basic components: a stationary tracking station, a computer connected to the tracking station, and an implement controller attached to the construction machine. The tracking station measures a distance and an azimuth (horizontal) angle to a remote target located on the construction machine and communicates that position information to the computer. The computer consults a stored site plan to determine what elevation is desired at that position and calculates a corresponding zenith (vertical) angle, and communicates the desired zenith angle to the tracking station. The tracking station in turn generates a zenith-reference laser beam at the desired zenith angle. The implement controller senses the zenith-reference laser beam and adjusts the grading implement relative to the zenith-reference laser beam until its desired position is obtained.

Another aspect of the present invention is a corresponding method of controlling the position of a grading implement of a construction machine. The method includes the steps of measuring a distance and an azimuth angle from a stationary tracking station to a remote target that is attached to the construction machine; determining a desired zenith angle as a function of the measured distance and azimuth angle of the remote target; generating a zenith-reference laser beam from the tracking station at the desired zenith angle; and positioning the grading implement at a desired position relative to the reference laser beam.

The tracking station is preferably a modified model AP-Li automatic tracking total station. Topcon Corporation's AP-L1 station is modified by adding a rotating or fan laser and by disabling the automatic zenith tracking. The tracking station projects the zenith-reference laser in a plane determined by the desired zenith computed by the computer as determined by the site plan. Alternatively, the AP-L1 is modified by disabling the automatic zenith tracking but not adding another laser, in which case the laser that measures the azimuth or horizontal angle is also used for setting the zenith or vertical angle reference.

The computer is preferably a lap-top computer, but its functions could be incorporated into the tracking station. It communicates with the tracking station through an RS-232 interface. The computer has a stored site map and a program to determine zenith angle given the measured azimuth angle and distance to the remote. target on the construction machine.

The implement controller is preferably a standard laser or LED receiver and height control system previously used with horizontal reference lasers, thus permitting the present invention and its expanded capabilities to be easily retrofitted with existing laser receivers. Also, a relatively simple laser receiver can be used, one with a stationary detector instead of a mobile detector or extensible mast.

An important feature of the present invention is that no data communication is required between the tracking station and the construction machine in order to control the elevation of the grading implement. The desired elevation is set according to the zenith angle of the reference laser beam, which is determined by the computer and set by the tracking station. The correct grade is attained by the implement controller simply by adjusting the implement height until the laser receiver detects the zenith-reference laser beam.

An additional capability of the present invention is to control the slope of the grading implement. This capability is accomplished by the computer outputting to the tracking station the desired slope at the measured position of the construction machine as established by the stored site plan. The tracking station encodes the slope information on the zenith-reference laser beam and communicates it to the laser receiver of the implement controller. The implement controller receives and decodes the slope information, compares the desired slope to the actual slope as determined by a slope sensor mounted on the implement, and adjusts the slope of the implement to conform to the desired value. This additional capability does require communication from the tracking station to the construction machine, but it is accomplished optically by the laser beam. The slope information may be dependent upon the orientation of the construction machine and the grading implement, so a conversion can be made either by the computer or the implement controller to account for those variables.

The machine control system of the present invention can be used on a wide variety of construction equipment, including, but not limited to, graders, pavers, dozers, and tractors. The machine control system can replace current automatic control systems that use stringlines, ground-contacting sensors, or horizontal laser reference planes for elevation control. Variations of the system can also be used for surveying and inspection by using the laser receiver detached from the construction machine.

As used herein, an azimuth angle is a horizontal angle measured in a horizontal plane between a fixed reference direction and a vertical plane that passes through the remote target. The fixed reference direction can be any direction selected for the convenience of the operator, such as true north, magnetic north, or other direction. A zenith angle is a vertical angle measured in a vertical plane between vertical and a straight line that passes through the remote target. While horizontal and vertical reference directions are the most common, other reference directions could be used in an equivalent manner. More generally, the present invention can be defined in terms of other polar coordinate systems, wherein two angles and a distance defines the position of the remote target. The use of the terms "azimuth" and "zenith" should not be considered limiting to any particular coordinate system.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

DETAILED DESCRIPTION OF THE PREFERRED EMBODIMENT

FIGS. 1 through 4 of the drawings depict various preferred embodiments of the present invention for purposes of illustration only. One skilled in the art will readily recognize from the following discussion that alternative embodiments of the structures and methods illustrated herein may be employed without departing from the principles of the invention described herein.

Figure 1:
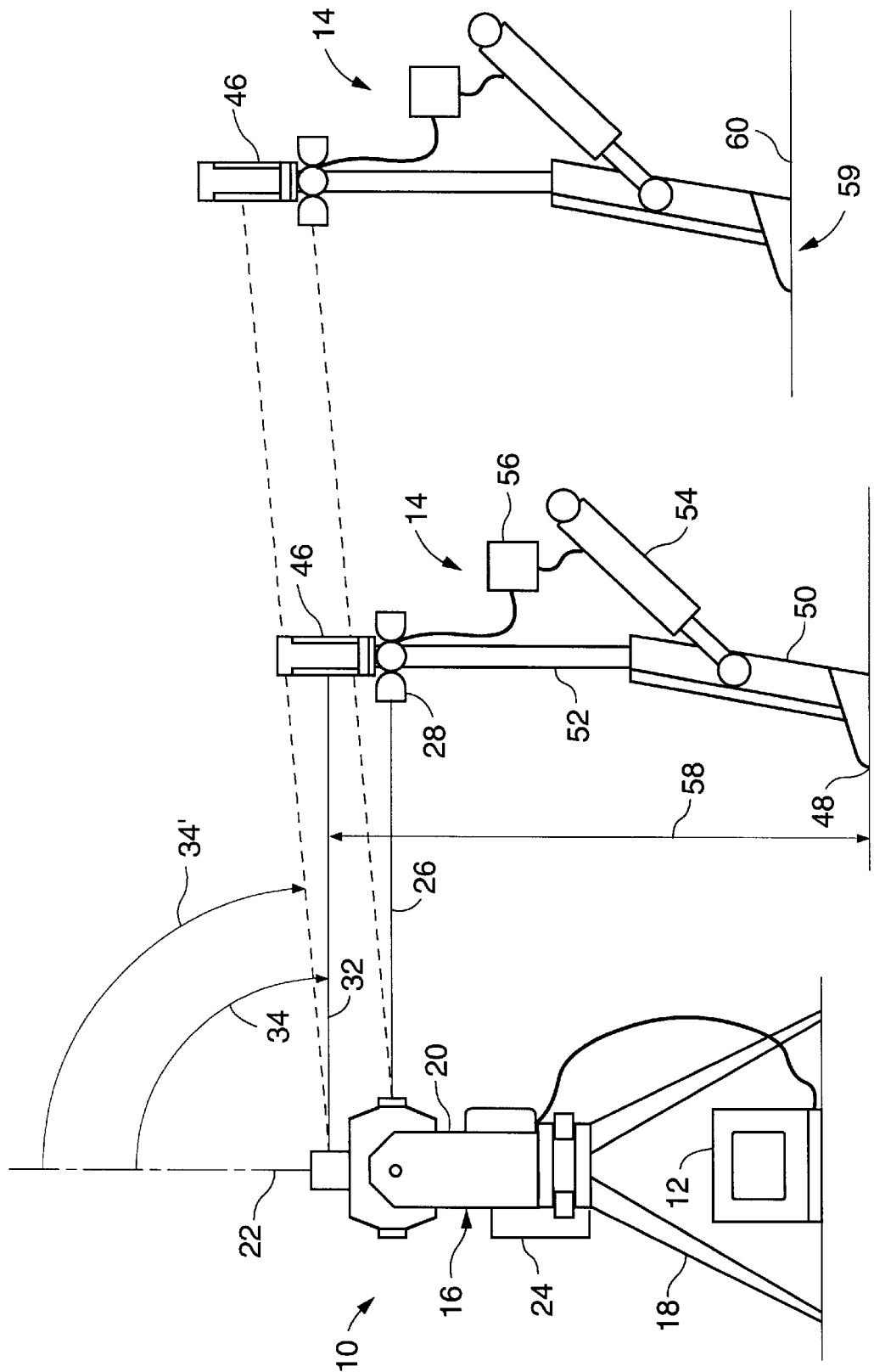
FIG. 1 is a side elevation view of a control system according to the present invention, illustrating a stationary tracking station and computer, and two positions of a mobile implement controller.

The preferred embodiment of the present invention is a control system and its method of automatically controlling the elevation of a grading implement of a construction machine. As shown in FIG. 1, the control system basically comprises a tracking station 10, a computer 12, and an implement controller 14.

The tracking station 10 has a tracking instrument 16 mounted on a tripod 18. The tracking station has a platform 20 that rotates about a vertical axis 22. The rotation of the platform is controlled by a servo 24 that aligns a laser beam 26 with a retroreflector 28 attached to the construction machine. The retroreflector 28 is preferably a mirrored cube, but alternatively could be reflective tape or other reflective objects. The tracking station 10 tracks the retroreflector 28 in azimuth by rotating the platform 20 to keep the laser beam 26 aligned with the retroreflector. The tracking station 10 also measures the distance to the retroreflector 28 by known electronic distance measurement (EDM) techniques. Initially, a telescope 30 is used to manually align the EDM laser beam 26 with the retroreflector 28, and thereafter the beam 26 automatically tracks the retroreflector.

The tracking station 10 further includes a laser that generates another laser beam 32 at a desired zenith angle 34. As further explained below, the computer 12 communicates to the tracking station 10 a zenith angle that establishes the orientation of the zenith-reference laser beam 32. The zenith angle 34 is a vertical angle between the vertical axis 22 and the laser beam 32.

Figure 2:
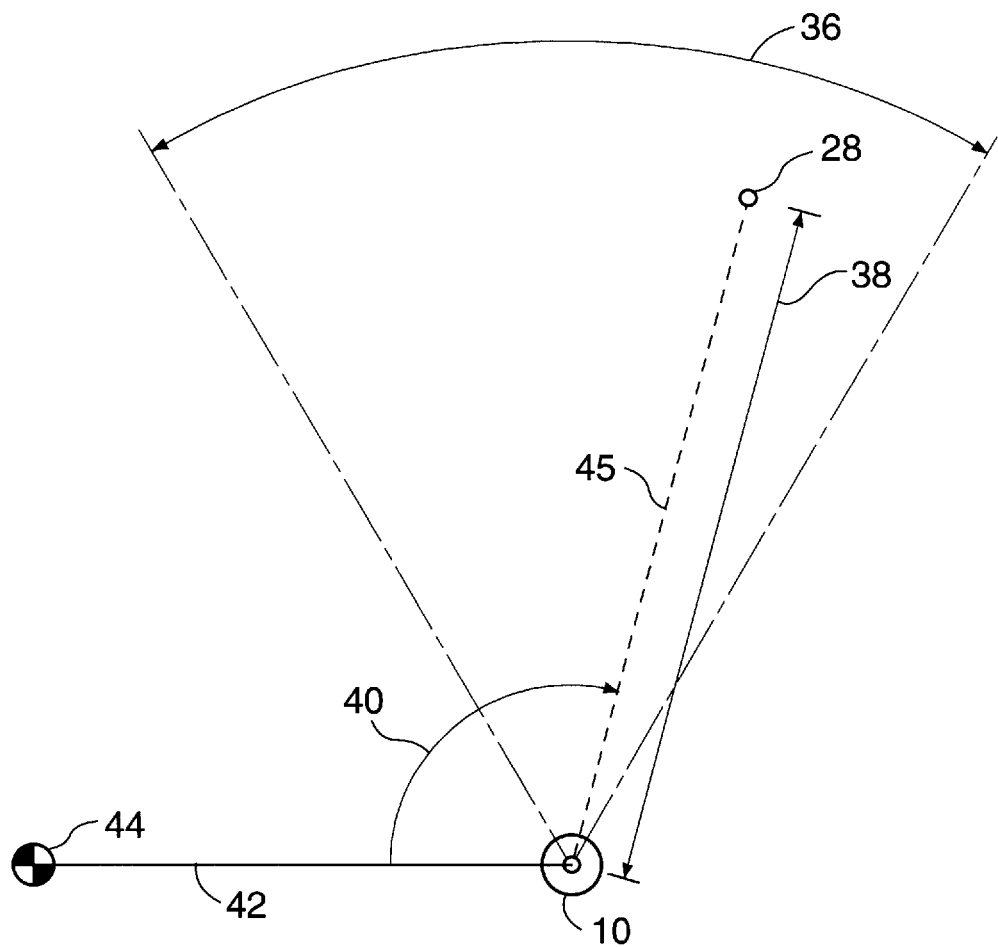
FIG. 2 is a plan view diagram of the relative locations of a control system according to the present invention.

Preferably, the zenith-reference laser beam 32 is projected in a fan, or rotates in a circle. FIG. 2 shows a fan projection 36 of the zenith-reference laser beam 32. A distance 38 is measured by the tracking station 10 to the retroreflector 28 mounted to the construction machine (not shown). FIG. 2 also illustrates the azimuth angle 40, which is the horizontal angle between a reference line 42 that extends from the tracking station 10 to a reference point 44 or in a predetermined reference direction, and the line of sight 45 of the tracking laser beam 26 that extends from the tracking station to the retroreflector 28. During initial set-up, the tracking station 10 is calibrated by aligning the laser beam 26 with the reference point 44 or a predetermined reference direction (such as north), and that alignment defines a zero point or datum for the rotation in a horizontal plane of the platform 20. The azimuth angle 40 measured to the retroreflector 28 is simply determined by measuring the angular rotation of the platform 20 from its zero point or datum.

The computer 12 is preferably a lap-top computer, but it can be any computer capable of communicating with the tracking station and performing the zenith angle computation. Preferably, the computer 12 and tracking station 10 communicate over conventional RS-232 ports.

Figure 3:
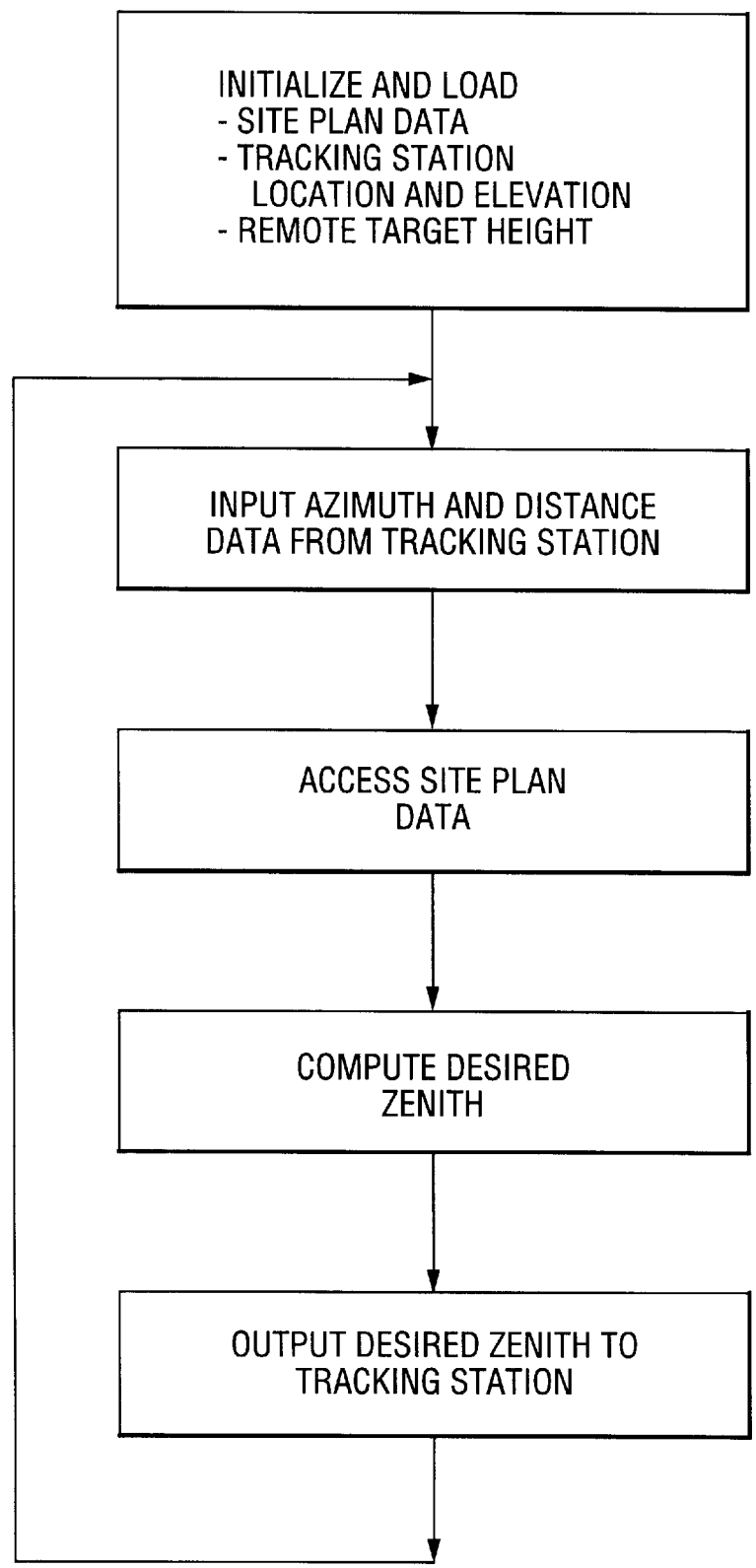
FIG. 3 is a simplified computer flow chart of a program utilized in the computer of the present invention.

A flow chart shown in FIG. 3 presents the basic operations of the computer 12. Before the control system can control the implement, a site plan must be loaded into the computer 12. The site plan defines the desired finished surface in terms of coordinates (Cartesian or polar) or vectors. Another task of the initial set-up is to define the location and elevation of the tracking station, so the computer can locate the tracking station relative to the site plan, since the distance, azimuth, and zenith parameters are defined relative to the tracking station. This task is done by surveying one or more reference points 44 by the tracking station 10 by using known surveying techniques. Another initial set-up task is to input data that defines the height 58 of a laser receiver 46 of the implement controller 14 relative to the cutting edge 48 of the grading implement 50 (FIG. 1). This height data enables the computer to adjust the zenith of the reference beam to compensate for the height of the laser receiver.

After the computer 12 is initialized, it operates in a continuous loop. The tracking station 10 measures the azimuth angle 40 and the distance 38 to the retroreflector 28 on the construction machine and feeds that data to the computer 12. The computer 12 accesses the site plan data and locates the measured position of the construction machine. That position has an elevation associated with it, which is used to compute the zenith angle 34 that will result in the correct finished elevation for the graded surface. The computer 12 then outputs the computed zenith value to the tracking station 10.

Returning now to FIG. 1, the remainder of the system and its operation will be explained. The tracking station 10, in response to the zenith data output by the computer 12, adjusts the angle of the zenith-reference beam 32 to the desired zenith angle 34 computed by the computer.

The implement controller 14 mounted on the construction machine includes a mast 52 that is mounted on the grading implement 50. The mast 52 moves up and down as the grading implement is moved up and down. The construction machine (not shown) has hydraulic cylinders 54 that adjust the position of the grading implement 50. A controller 56 is coupled to the laser receiver 46 and to the hydraulic cylinder 54 to control the cylinders to move the implement up or down as appropriate. The retroreflectors 28 and the laser receiver 46 are mounted near the top of the mast 52.

In operation, the laser receiver 46 detects the zenith-reference laser beam 32. The controller 56 determines whether an up or down adjustment to the grading implement 50 is required to center the beam in the receiver 46, and if so controls the hydraulic cylinders 54 to make the appropriate adjustment. If the zenith-reference laser beam 32 strikes the top portion of the laser receiver 46, then the grading implement is too low and the controller causes an upward adjustment in position. Conversely, if the zenith-reference laser beam 32 strikes the lower portion of the laser receiver 46, then the grading implement is too high and the controller causes a downward adjustment. If the laser beam 32 strikes the center of the laser receiver, then no adjustment is needed because the grading implement is correctly positioned. The cutting edge 48 of the grading implement is a distance 58 below the center of the laser receiver 46, and that distance is utilized by the computer in its determination of the zenith angle.

When the construction machine is moved to a different location 59 (shown at the right side of FIG. 1), the site plan may dictate a different finished elevation 60. The different location will result in a different measured distance and/or azimuth to the retroreflector 28. The tracking station 10, which repeatedly measures the position of the retroreflector at a rate of 20 times per second, supplies the updated measurement data to the computer 12, which in turn supplies an updated zenith angle 34' that corresponds to the different finished elevation 60 at the new position. The implement controller 14 causes the hydraulic cylinders 54 to move the grading implement 50 so that the center of the laser receiver 46 detects the zenithreference laser beam 32, thus assuring that the implement grades the correct elevation.

The tracking station 10 of the present invention is preferably a modified AP-L1. Topcon Corporation's standard AP-L1 automatically tracks a remote target in both azimuth and zenith and also measures distance. The AP-L1 is modified to make the tracking station 10 by adding a fan or rotating laser device 62 to the top of the AP-L1 to generate the zenith-reference laser beam 32. Also, the zenith tracking function of the AP-L1 is disabled, because the zenith is no longer a measured variable; instead the zenith is the computed output of the computer 12.

The implement controller 14 of the present invention preferably includes a Topcon model 9254 control box and a Topcon model LS-B2 laser receiver.

Slope control is a feature that can be accomplished by the present invention by adding a communication link from the tracking station 10 to the implement controller 14. This can be done by modulating the zenith-reference laser beam with slope data determined by the computer with the aid of the site plan. The frequency modulation encodes the desired slope onto the laser beam 32 using known techniques. The laser receiver 46 decodes the information and sends it to a slope controller (not illustrated) located on the construction machine. The slope controller includes a slope sensor (not illustrated) that is attached to the implement to give a measured slope value. The slope controller does a comparison between the measured slope and the desired slope received from the tracking station and adjusts the implement accordingly until its slope matches the desired slope.

The slope information may be dependent upon the orientation of the construction machine and the grading implement. Typically, the slope would be defined relative to the site plan and would have to be converted to slope information relative to the orientation of the construction machine and of the grading implement. Such a conversion can be made either by the computer or the implement controller.

Figure 4:
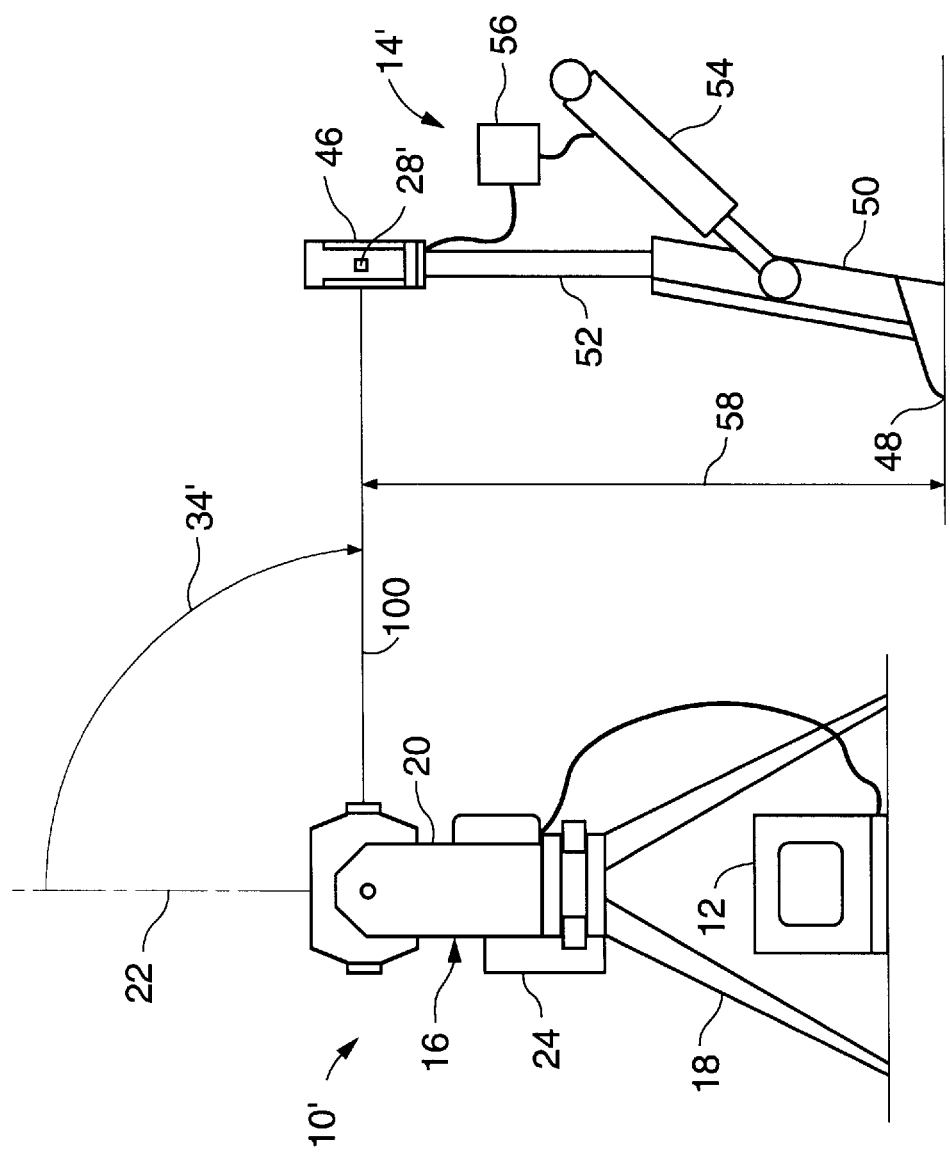
FIG. 4 is a side elevation view of an alternative control system according to the present invention.

FIG. 4 illustrates another version of the present invention in which both the zenith-reference and azimuth measurement are performed by the same laser. The tracking station 10' of FIG. 4 generates a single laser beam 100, which hits a retroreflector 28' on the laser receiver 46 and is reflected back to a detector on the tracking station. The tracking station 10' thus measures the distance and azimuth in the same way as the tracking station 10 of the first-disclosed embodiment of FIG. 1. The tracking station 10' differs in that the same laser beam also serves to set the desired zenith angle 34'. The retroreflector 28' is located on the laser receiver 46 at the same height as the center of the laser receiver because the laser beam 100 hits the retroreflector to measure the azimuth angle and the same beam hits the center of the laser receiver when the implement is at the correct height. In this case, the retroreflector 28' is preferably a reflective tape mounted on the laser receiver. The laser beam 100 is a sweeping fan of pulsed light that is parallel to the optical path of the telescope of the tracking station.

From the above description, it will be apparent that the invention disclosed herein provides a novel and advantageous apparatus and method for automatically controlling the elevation of a grading implement. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A control system for controlling the position of a grading implement of a construction machine, said control system comprising:
    a tracking station that includes means for measuring a distance and a first angle to a remote target, and further includes means for generating a laser beam that establishes a desired second angle to the remote target, wherein the first angle is measured in a first plane with respect to a first reference direction and the second angle is measured in a second plane with respect to a second reference direction;
    computing means coupled to the tracking station for determining the desired second angle in response to the measured distance and first angle of the remote target;
    the remote target coupled to the construction machine for movement therewith; and
    an implement controller coupled to the grading implement and including means for positioning the grading implement at a desired position relative to the laser beam.

2. A control system for controlling the position of a grading implement of a construction machine, said control system comprising:
    a tracking station that includes means for measuring a distance and an azimuth angle to a remote target, and further includes means for generating a laser beam that establishes a desired zenith angle to the remote target;
    computing means coupled to the tracking station for determining the desired zenith angle in response to the measured distance and azimuth angle of the remote target;
    the remote target coupled to the construction machine for movement therewith; and
    an implement controller coupled to the grading implement and including means for positioning the grading implement at a desired position relative to the laser beam.

3. A control system as recited in claim 2 wherein the tracking station further includes means for sweeping the laser beam in a reference plane having the desired zenith angle, and wherein the implement controller includes means for positioning the grading implement at a desired position relative to the reference plane of the swept laser beam.

4. A control system as recited in claim 3 wherein the means for positioning the grading implement at a desired position includes a laser receiver attached to the grading implement and means for adjusting the height of the grading implement so that the laser receiver detects the laser beam.

5. A control system as recited in claim 2 wherein the tracking station includes a movable platform and a servo motor that rotates the platform about a vertical axis, and wherein the tracking station determines the azimuth angle according to the angular position of the platform when the platform is aligned with the remote target.

6. A control system as recited in claim 5 wherein the remote target is a retroreflector, wherein the tracking station includes a second laser mounted to the movable platform and a laser detector that detects a second laser beam reflected from the retroreflector, and wherein the platform is aligned with the remote target when a beam originating from the second laser and reflected from the retroreflector is detected by the laser detector.

7. A control system as recited in claim 5 wherein the remote target is a retroreflector, wherein said means for generating a laser beam is mounted to the movable platform and the tracking station includes a laser detector that detects a laser beam reflected from the retroreflector, and wherein the platform is aligned with the remote target when the laser beam reflected from the retroreflector is detected by the laser detector.

8. A control system as recited in claim 2 wherein the computing means includes a stored representation of a site plan from which a desired zenith angle can be determined given the measured distance and azimuth angle of the remote target.

9. A control system as recited in claim 2 wherein the implement controller includes a laser beam receiver coupled to the grading implement for movement therewith and a controller coupled to the implement that adjusts the height of the grading implement until the laser beam receiver detects the laser beam.

10. A control system as recited in claim 2 further comprising means associated with the computer for determining a desired slope of the grading implement as a function of the measured distance and azimuth angle, means associated with the tracking station for transmitting the desired slope to the implement controller, and means associated with the implement controller for positioning the grading implement at the desired slope.

11. A control system for controlling the position of a grading implement of a construction machine, said control system comprising:
    a tracking station including means for sweeping a laser beam in a reference plane having a desired zenith angle to a remote target, and means for tracking the remote target and for measuring a distance and an azimuth angle to the remote target;
    computing means for supplying to the tracking station the desired zenith angle as a function of the measured distance and azimuth angle of the remote target, wherein the computing means includes a stored representation of a site plan from which a desired zenith angle can be determined given the measured distance and azimuth angle;
    retroreflector coupled to the construction machine for movement therewith and providing the remote target tracked by the tracking station; and
    an implement controller coupled to the grading implement and including a laser beam receiver coupled to the grading implement for movement therewith and a controller means coupled to the implement for adjusting the height of the grading implement so that the laser beam receiver detects the laser beam.

12. A method for controlling the position of a grading implement of a construction machine, said method comprising the steps of:

measuring a distance and a first angle from a tracking station to a remote target that is mounted on the construction machine, wherein the first angle is measured in a first plane with respect to a first reference direction;

determining a desired second angle to the remote target as a function of the measured distance and first angle of the remote target, wherein the second angle is measured in a second plane with respect to a second reference direction;

generating a laser beam at the desired second angle; and positioning the grading implement at a desired position relative to the laser beam.

13. A method for controlling the position of a grading implement of a construction machine, said method comprising the steps of:

measuring a distance and an azimuth angle from a tracking station to a remote target that is mounted on the construction machine;

determining a desired zenith angle to the remote target as a function of the measured distance and azimuth angle of the remote target;

generating a laser beam at the desired zenith angle; and positioning the grading implement at a desired position relative to the laser beam.

14. A method as recited in claim 13 further including the steps of sweeping the laser beam in a reference plane having the desired zenith angle, and positioning the grading implement at a desired position relative to the reference plane of the swept laser beam.

15. A method as recited in claim 14 wherein the step of positioning the grading implement includes the step of adjusting the height of the grading implement so that a laser receiver coupled to the grading implement detects the laser beam.

16. A method as recited in claim 13 wherein the step of measuring an azimuth angle includes rotating a movable platform until the platform is aligned with the remote. target.

17. A method as recited in claim 16 wherein the remote target is a retroreflector, and wherein the step of measuring an azimuth angle includes generating a second laser beam and measuring the angle of the movable platform at a position where the second laser beam is reflected back to the source thereof from the retroreflector.

18. A method as recited in claim 16 wherein the remote target is a retroreflector, and wherein the step of measuring an azimuth angle includes measuring an angle of the movable platform at a position where said laser beam is reflected back to the source thereof from the retroreflector.

19. A method as recited in claim 13 further including the step of storing data representative of a site plan from which a desired zenith angle can be determined given the measured distance and azimuth angle of the remote target.

20. A method as recited in claim 13 further including the steps of determining a desired slope of the grading implement as a function of the measured distance and azimuth angle, and positioning the grading implement at the desired slope.

21. A method for controlling the position of a grading implement of a construction machine, said method comprising the steps of:

storing a representation of a site plan from which a desired zenith angle can be determined given a measured distance and azimuth angle;

tracking a retroreflector coupled to the construction machine and measuring a distance and an azimuth angle to the retroreflector;

computing a desired zenith angle to the retroreflector from the site plan as a function of the measured distance and azimuth angle of the retroreflector;

sweeping a laser beam in a reference plane having the desired zenith angle; and adjusting the height of the grading implement so that a laser beam receiver coupled to the grading implement detects the laser beam.

* * * * *

UNITED STATES PATENT AND TRADEMARK OFFICE
CERTIFICATE OF CORRECTION

PATENT NO. : 5,771,978
DATED : June 30, 1998
INVENTOR(S) : Davidson, et. al.

It is certified that error appears in the above-identified patent and that said Letters Patent is hereby corrected as shown below:

Column 7, line 32, delete "measured" and replace with --established--.

Signed and Sealed this

Sixth Day of April, 1999

Attest:

Q. TODD DICKINSON

Attesting Officer

Acting Commissioner of Patents and Trademarks